(12) United States Patent
Bloom et al.

(10) Patent No.: US 7,629,399 B2
(45) Date of Patent: Dec. 8, 2009

(54) THICKENING SYSTEMS AND AQUEOUS-COATING COMPOSITIONS, AND METHODS OF MAKING AND USING THE SAME

(75) Inventors: Paul D. Bloom, Decatur, IL (US); Teodora R. Tabuena-Salyers, Urbana, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 11/058,657

(22) Filed: Feb. 15, 2005

(65) Prior Publication Data

US 2005/0192383 A1 Sep. 1, 2005

Related U.S. Application Data

(60) Provisional application No. 60/548,260, filed on Feb. 27, 2004, provisional application No. 60/621,884, filed on Oct. 25, 2004.

(51) Int. Cl.
*C08L 1/00* (2006.01)
*C08K 5/13* (2006.01)
*C08K 5/10* (2006.01)

(52) U.S. Cl. .................... 524/55; 524/313; 524/334; 524/35; 524/306; 106/205.71

(58) Field of Classification Search .............. 524/55, 524/315, 317, 306, 313, 35, 334; 428/497, 428/498; 106/205.71
See application file for complete search history.

(56) References Cited

U.S. PATENT DOCUMENTS

| | | | | |
|---|---|---|---|---|
| 3,998,973 A | * | 12/1976 | Carlson | ............ 514/770 |
| 4,218,262 A | | 8/1980 | Warren | |
| 4,810,738 A | * | 3/1989 | Caridi | .......... 524/317 |
| 4,859,350 A | * | 8/1989 | Gillberg-LaFore et al. | .. 427/394 |
| 5,268,466 A | | 12/1993 | Burdick | |

(Continued)

FOREIGN PATENT DOCUMENTS

EP 0 302 240 B1 2/1989

(Continued)

OTHER PUBLICATIONS

"Xanthan Gum—water structure and behavior", websites.*

(Continued)

*Primary Examiner*—Duane Smith
*Assistant Examiner*—Ives Wu
(74) *Attorney, Agent, or Firm*—K&L Gates LLP

(57) ABSTRACT

Various non-limiting embodiments disclosed herein relate generally to aqueous-coating compositions and thickening systems that can be used in aqueous coating-compositions. More particularly, certain non-limiting embodiments disclosed herein relate to aqueous-coating compositions, such as latex paints, comprising xanthan gum and at least one ester of an unsaturated fatty acid that is essentially free of volatile organic compounds as determined by EPA Reference Method 24. Other non-limiting embodiments relate to thickening systems comprising a mixture of a xanthan gum and at least one ester of an unsaturated fatty acid, wherein the thickening system is essentially free of volatile organic compounds as determined by EPA Reference Method 24. Still other non-limiting embodiments relate to methods of making and using the aqueous coating-compositions and thickening systems disclosed herein.

23 Claims, 4 Drawing Sheets

U.S. PATENT DOCUMENTS

| | | | |
|---|---|---|---|
| 5,422,112 A * | 6/1995 | Williams | 424/401 |
| 5,521,234 A * | 5/1996 | Brown et al. | 524/44 |
| 6,117,226 A | 9/2000 | Dial et al. | |
| 6,387,947 B1 * | 5/2002 | Schnittger et al. | 514/461 |
| 6,924,333 B2 * | 8/2005 | Bloom et al. | 524/315 |
| 2002/0052441 A1 | 5/2002 | Burdick et al. | |
| 2003/0098438 A1 | 5/2003 | Haslin | |
| 2003/0181557 A1 * | 9/2003 | Suzuki et al. | 524/334 |
| 2003/0187103 A1 | 10/2003 | Bloom et al. | |
| 2004/0039095 A1 | 2/2004 | Van de Mark et al. | |
| 2005/0192383 A1 * | 9/2005 | Bloom et al. | 524/55 |
| 2007/0093579 A1 * | 4/2007 | Van de Mark et al. | 524/306 |

FOREIGN PATENT DOCUMENTS

| | | |
|---|---|---|
| WO | WO 89/01018 | 2/1989 |

OTHER PUBLICATIONS

"Hawley's Condensed Chemical Dictionary", p. 145,349 11$^{th}$ Edition.*

Xanthan Gum—water structure and behavior, websites.*

"ASTM D4400-99: Standard Test Method for Sag Resistance of Paints Using a Multinotch Applicator" ASTM, West Conshohocken, PA (1999) pp. 317-320.

"Method 24- Determination of Volatile Matter Content, Water Content, Density, Volume Solids, and Weight Solids of Surface Coatings," 40 C.F.R. Pt, 60, App. A-7, pp. 58-62.

"Archer RC™ Reactive Coalescent: The Natural Reactive Coalesent FAQs" available at http://www.archer-rc.com/faq, Archer Daniels Midland, (2003) pp. 1-2.

"Rapid Dispersing Xanthan Gum Now Available" *The TIC Times*, Summer, TIC Gums, Inc. Belcamp, MD (2002) p. 3.

"Dispersion of Xanthan Gum into Water" *Quadro® Ytron® Application Bulletin APYF05*, available at http://www.quadro.com/pdf/apyf05_dispersion_of_xanthan_gum_into_water.pdfp. 1, Quadro (2002).

Winwood, Rob, "Xanthan Gum in Water-Based Paints and Coatings" *Polymer Paint Colour Journal*, (Aug. 1997), pp. 15 & 19.

Winwood, Rob, "Xanthan Gum—a Natural, Rheological Control Agent for Waterborne Coatings,"*Woodcoatings Developments for a Sustainable Future, Proceedings of the 4$^{th}$ Wood Coatings Congress*, The Hague, Netherlands, 25-27 (Oct. 2004) pp. 1-5.

"Natrolsol® Plus Modified Hydroxyethylcellulose Proven Performance as a Thickner for Latex Paints," Hercules Inc. Wilmington, DE (1996) pp. 1-16.

George B. Poppe, "Methods for the Preparation of Polyol Esters That are Light in Color" U.S. Appl. No. 10/758,267, filed Jan. 16, 2004.

* cited by examiner

THICKENING SYSTEMS AND AQUEOUS-COATING COMPOSITIONS, AND METHODS OF MAKING AND USING THE SAME

CROSS-REFERENCE TO RELATED APPLICATIONS

This application claims the benefit of provisional application Ser. No. 60/548,260, filed Feb. 27, 2004 and provisional application Ser. No. 60/621,884, filed Oct. 25, 2004, the contents of each of which are hereby specifically incorporated by reference herein.

BACKGROUND

Various non-limiting embodiments disclosed herein relate generally to thickening systems including xanthan gum that can be used in aqueous-coating compositions and aqueous coating-compositions prepared using the same. Still other non-limiting embodiments disclosed herein relate to methods of making and using thickening systems including xanthan gum and methods of making and using aqueous-coating compositions including xanthan gum.

Aqueous-coating compositions, such as latex paints, generally comprise a latex polymer (i.e. polymer suspension or emulsion in water), one or more inorganic pigments, and a variety of other components that are selected to modify one or more of the processing, application, and filming-forming characteristics of the aqueous-coating compositions. For example, in addition to a latex polymer and inorganic pigments, typical latex paints generally include at least one dispersant that aids in dispersing the inorganic pigments in the paint composition, at least one thickener that modifies the rheological characteristic of the paint composition, and at least one coalescing aid that aids in film-formation as the paint composition dries. Other common additives to latex paint compositions include, for example, surfactants, solvents, pH modifiers, defoamers, biocides, colorants, and humectants.

One common thickener for aqueous-coating compositions, such as latex paint compositions, is hydroxyethylcellulose ("HEC"). HEC modifies the viscosity and rheology of the aqueous-coating composition by imparting thrixotropic (or shear-thinning) behavior to the coating composition. More specifically, when added to an aqueous-coating composition, an increase in the hydrodynamic volume (swelling) of the HEC polymer chains results from hydrogen bonding between the HEC and the water in the coating composition. Swelling and entanglement of the HEC polymer chains causes the viscosity of the coating composition to increase. However, when a shear force is applied to the aqueous-coating composition, for example when the coating composition is applied to a substrate, the viscosity of the HEC thickened aqueous-coating composition decreases, permitting good flow of the coating onto the substrate. When the shear force is removed, the viscosity again increases, thereby reducing the tendency of the coating to run.

Hydrophobically modified hydroxyethylcellulose ("HM-HEC") is also a known thickener for aqueous-coating compositions. Like HEC, HMHEC modifies the viscosity and rheology of the aqueous-coating composition by imparting thrixotropic (or shear-thinning) behavior to the coating composition. Further, like HEC, HMHEC can increase the viscosity of the coating composition due to interaction with the water in the coating composition. However, unlike HEC, because HMHEC contains hydrophobic groups (for example, long-chain alkyl groups) bound to the HEC polymer chain, HMHEC also builds viscosity due to association of the hydrophobic groups.

Xanthan gum is a high molecular weight, naturally occurring polysaccharide produced by the fermentation of glucose with *Xanthomonia campestris*. Like HEC and HMHEC discussed above, xanthan gum can be used as a thickener to impart thrixotropic behavior to aqueous-coating compositions. However, unlike HEC and HMHEC, when incorporated into water, xanthan gum molecules have a stiff, rod-like structure. Thus, rather than building viscosity by polymer chain entanglement and/or hydrophobic associations, xanthan gum is generally believed to build viscosity in aqueous-coating compositions by the formation of a three-dimensional network of xanthan gum molecules held together by hydrogen bonds. Since this network structure can be rapidly broken down by the application of an external shear force to the structure, aqueous-coating compositions thickened by xanthan gum are highly shear-thinning. Further, since the viscosity-building network structure of hydrated xanthan gum is rapidly re-established when the external shear force is removed, aqueous-coating compositions thickened with xanthan gum tend to regain viscosity more rapidly than coating compositions thickened with HEC or HMHEC.

However, due to the rapid hydration of unmodified xanthan gum in water, direct incorporation of unmodified xanthan gum into aqueous-coating compositions can be difficult. For example, directly adding unmodified xanthan gum powder to an aqueous-coating composition can result in an extremely rapid increase in the viscosity of the aqueous-coating composition and the formation of a gel containing agglomerates or lumps of unhydrated xanthan gum. Such gel formation is generally undesirable as it can make both mixing of the coating composition and incorporation of other components into the coating composition difficult. Thus, while both HEC and HMHEC can be added directly to an aqueous-coating composition in the form of a powder, attempts to add xanthan gum powders directly to aqueous-coating compositions have generally involved the use of specialized mixing procedures or equipment, for example high-shear mixers, or xanthan gum powders that have been encapsulated or surface-modified with another substance to retard hydration.

Although it is possible to premix the aforementioned thickeners with a solvent such as propylene glycol or a coalescing aid such as an ester alcohol prior to addition of the thickener to the coating composition, the use of these solvents and coalescing aids is generally undesirable in aqueous-coating compositions due to their high-VOC (volatile organic compound) content. Further, while premixes of HEC and HMEC with water can be made that do not contribute to the VOC content of the coating composition, as discussed above, it is generally difficult to incorporate xanthan gum directly into water unless specialized mixing or surface-modified powders are used. Additionally, since water premixes do not aid in film-formation during drying of the coating composition, even where such water-based premixes are employed they do not reduce or eliminate the need to add a coalescing aids to the coating composition.

Accordingly, it would be useful to develop aqueous-coating compositions that include a xanthan gum thickener and a coalescing aid that does not contribute to the VOC content of the coating composition, as well as xanthan gum-based thickening systems that could be readily incorporated into a variety of aqueous-coating compositions and that would not contribute to the VOC content of aqueous-coating compositions into which they were incorporated. Further, it would be desirable if such thickening systems could also reduce or eliminate the need to use other coalescing aids in the coating composition that contribute to the VOC-content of the aqueous-coating composition.

BRIEF SUMMARY OF THE DISCLOSURE

Various non-limiting embodiments disclosed herein relate to aqueous-coating compositions, such as but not limited to latex paints. For example, one non-limiting embodiment provides an aqueous-coating composition comprising a xanthan gum and at least one ester of an unsaturated fatty acid that is essentially free of volatile organic compounds as determined by EPA Reference Method 24. Another non-limiting embodiment provides a latex paint comprising a latex polymer, at least one pigment, a xanthan gum, and at least one polyol monoester of an unsaturated vegetable oil fatty acid that is essentially free of volatile organic compounds as determined by EPA Reference Method 24.

Other non-limiting embodiments relate to substrates comprising an at least partial coating of an aqueous-coating composition on at least a portion of a surface thereof, the aqueous-coating composition comprising a xanthan gum and at least one ester of an unsaturated fatty acid that is essentially free of volatile organic compounds as determined by EPA Reference Method 24.

Still other non-limiting embodiments disclosed herein relate to thickening systems and aqueous-coating compositions made therefrom. For example, one non-limiting embodiment provides a thickening system comprising a xanthan gum and a carrier comprising at least one ester of an unsaturated fatty acid, wherein the thickening system is essentially free of volatile organic compounds as determined by EPA Reference Method 24. Another non-limiting embodiment provides a thickening system comprising an unmodified xanthan gum and a carrier, wherein the thickening system is essentially free of volatile organic compounds as determined by EPA Reference Method 24.

Another non-limiting embodiment provides an aqueous-coating composition prepared from a thickening system comprising a xanthan gum and a carrier comprising at least one ester of an unsaturated fatty acid, wherein the thickening system is essentially free of volatile organic compounds as determined by EPA Reference Method 24.

Other non-limiting embodiments relate to methods of forming thickening systems and methods of forming aqueous-coating composition. For example, one non-limiting embodiment provides a method of forming a thickening system comprising combining a xanthan gum and a carrier comprising at least one ester of an unsaturated fatty acid, the carrier being essentially free of volatile organic compounds as determined by EPA Reference Method 24; and dispersing at least a portion of the xanthan gum in at least a portion of the carrier to form the thickening system.

Another non-limiting embodiment provides a method of forming an aqueous-coating composition comprising forming a thickening system comprising a mixture of a xanthan gum and a carrier comprising at least one ester of an unsaturated fatty acid, the thickening system being essentially free of volatile organic compounds as determined by EPA Reference Method 24; combining at least a portion of the thickening system with at least a portion of an aqueous-coating composition; and at least partially hydrating at least a portion of the xanthan gum.

Still another non-limiting embodiment provides a method of forming an at least partial coating of an aqueous-coating composition on at least a portion of a substrate, the method comprising providing an aqueous-coating composition comprising a latex polymer, a xanthan gum, and at least one ester of an unsaturated fatty acid that is essentially free of volatile organic compounds as determined by EPA Reference Method 24; and applying at least a portion of the aqueous-coating composition to at least a portion of the substrate.

BRIEF DESCRIPTION OF THE SEVERAL VIEWS OF THE DRAWING(S)

Various non-limiting embodiments disclosed herein will be better understood when read in conjunction with the drawings, wherein.

DETAILED DESCRIPTION

Figure 1:
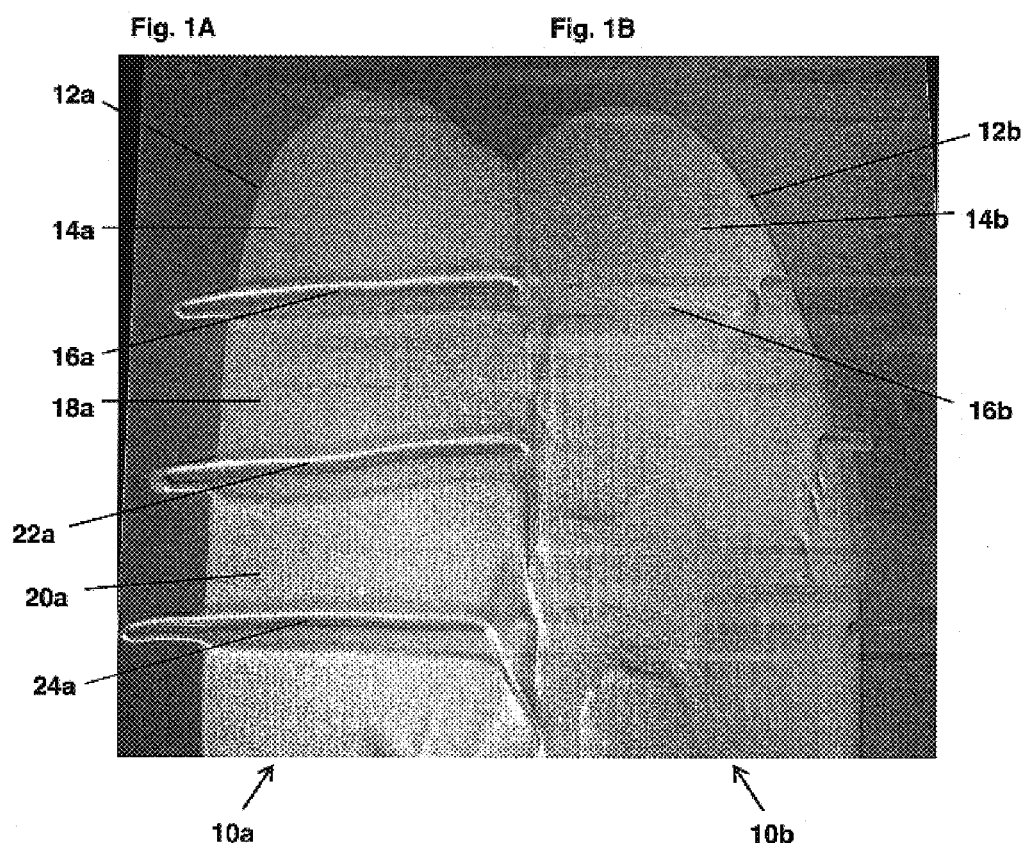
FIG. 1A is a photograph of a MODIFIED SAG RESISTANCE TEST substrate for a 30 mil thick coating of an aqueous-coating composition according to various non-limiting embodiments disclosed herein.
FIG. 1B is a photograph of a MODIFIED SAG RESISTANCE TEST substrate for a 30 mil thick coating of a conventional aqueous-coating composition.

For the purposes of this specification, unless otherwise indicated, all numbers expressing quantities of ingredients, mixing conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Additionally, while the numerical ranges and parameters setting forth the broad scope of the invention are approximations as discussed above, the numerical values set forth in the Examples section are reported as precisely as possible. It should be understood, however, that such numerical values inherently contains certain errors resulting from the measurement equipment and/or measurement technique.

Any patent, publication, or other disclosure material, in whole or in part, that is said to be incorporated by reference herein is incorporated herein only to the extent that the incorporated material does not conflict with the existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements or other disclosure material set forth herein will only be incorporated to the extent that no conflict arises between the incorporated material and the existing disclosure material.

As previously discussed, various non-limiting embodiments of the present invention are directed toward thicken systems that can be used in conjunction with aqueous-coating compositions. As used herein the term "aqueous-coating composition" means a mixture of water and at least one other component that is adapted to form an at least partial coating when applied to a substrate. Additionally, as used herein the term "mixture" refers to any combination of at least two components, and includes, for example, blends, dispersions, solutions, emulsions, suspensions, and combinations thereof. Specific non-limiting examples of aqueous-coatings compositions with which the thickening systems according to various non-limiting embodiments disclosed herein can be used, include but are not limited to: latex paints, primers, textile sizing compositions, sealants, caulks, and adhesives.

As used herein, the term "latex paint" refers to an aqueous-coating composition comprising an aqueous suspension or emulsion of a polymer combined with one or more other additives. Non-limiting examples of such additives include surfactants, dispersants, solvents, pH modifiers, defoamers, biocides, humectants, colorants, pigments, coalescing aids and thickeners. Non-limiting examples of latex paints include latex paints that are primarily intended for interior or exterior architectural applications, and latex paints that are primarily intended for interior or exterior industrial maintenance applications. Further, the latex paints according to various non-limiting embodiments disclosed herein can have any desired gloss-level.

Various non-limiting embodiments of thickening systems according to the present invention will now be described. One non-limiting embodiment provides a thickening system comprising a mixture of a xanthan gum and a carrier comprising at least one ester of an unsaturated fatty acid, wherein the thickening system is essentially free of volatile organic compounds ("VOC") as determined by EPA Reference Method 24. Another non-limiting embodiment provides a thickening system comprising an unmodified xanthan gum and a carrier, wherein the thickening system is essentially free of volatile organic compounds as determined by EPA Reference Method 24. Non-limiting methods of making thickening systems according to various non-limiting embodiments are described in more detail herein below.

As discussed above, xanthan gum is a high molecular weight, naturally occurring polysaccharide that is useful as a thickener. However, while xanthan gum can be used as a thickener for aqueous-coating compositions, the direct incorporation of xanthan gum into an aqueous-coating composition is generally difficult due to the rapid hydration of xanthan gum in water. However, the inventors have found that by forming a thickening system comprising a mixture of a xanthan gum and a carrier the xanthan gum can be readily dispersed to the aqueous-coating composition without the need to use high shear mixing equipment or modified xanthan gum powders. Further, because the thickening systems according to various non-limiting embodiments disclosed are essentially free of volatile organic compounds as determined by EPA Reference Method 24, they do not contribute to the VOC content of the aqueous-coating composition into which they are incorporated.

As used herein, the term "essentially free of volatile organic compounds" means less than 10 grams of VOC per liter of material tested according to EPA Reference Method 24. EPA Reference Method 24 is found at 40 C.F.R. §60, Appendix A and is hereby specifically incorporated by reference herein. Further, according to various non-limiting embodiments disclosed herein, the thickening systems and carriers that are essentially free of volatile organic compounds as determined by EPA Reference Method 24 can be free of volatile organic compounds as determined by EPA Reference Method 24. As used herein with reference to the thickening systems and carriers, the term "free of volatile organic compounds" means the amount of VOC measured using EPA Reference Method 24 is within the standard error of the test method and therefore statistically insignificant. The error for EPA Reference Method 24 is described in the article by Mania et al. in the August 2001 issue of *The Journal of Coatings Technology*, which is hereby specifically incorporated by reference herein.

Xanthan gums that are suitable for use in conjunction with various non-limiting embodiments disclosed herein include, but are not limited to, unmodified xanthan gums, such as XG614 xanthan gum; and surface-modified xanthan gums (i.e., xanthan gums that have been treated for dispersibility), such as XG625 xanthan gum; and mixtures thereof. XG614 and XG 625 xanthan gums are commercially available form Archer Daniels Midland Company of Decatur, Ill. as OptiXan™ brand xanthan gum and OptiXan™-D brand xanthan gum, respectively. In one specific non-limiting embodiment, the thickening system comprises an unmodified xanthan gum.

Non-limiting examples of unsaturated fatty acid esters that are suitable for use in the thickening systems according to various non-limiting embodiments disclosed herein include: propylene glycol monoesters of unsaturated fatty acids, dipropylene glycol monoesters of unsaturated fatty acids, ethylene glycol monoesters of unsaturated fatty acids, diethylene glycol monoesters of unsaturated fatty acids, and methyl esters of unsaturated fatty acids. Non-limiting methods of making suitable unsaturated fatty acid esters are disclosed in U.S. application Ser. No. 10/758,267, which is hereby specifically incorporated by reference herein.

Further, according to various non-limiting embodiments disclosed herein the at least one ester of an unsaturated fatty acid can be an ester of an unsaturated vegetable oil fatty acid. While it is contemplated that any unsaturated vegetable oil fatty acid ester can be used in conjunction with the thickening systems according to various non-limiting embodiments disclosed herein, some unsaturated vegetable oil fatty acid esters, such as fatty acid esters of linseed oil and soy bean oil, can cause yellowing of the coating composition into which they are incorporated. Thus, according to various non-limiting embodiments wherein yellowing of the coating composition can be problematic, the unsaturated vegetable oil fatty acid ester can be chosen from non-yellowing unsaturated vegetable oil fatty acids esters, such as corn oil fatty acids esters and sunflower oil fatty acids esters. Nevertheless, in certain non-limiting embodiments wherein yellowing is not problematic and/or a decolorization step or additive is employed, the carrier can comprise an unsaturated vegetable oil fatty acid ester that can cause yellowing, either alone or in conjunction with a non-yellowing fatty acid ester.

For example, in one non-limiting embodiment, the ester of an unsaturated fatty acid can be a polyol monoester of an unsaturated vegetable oil fatty acid selected from the group consisting of corn oil fatty acids, sunflower oil fatty acids, and mixtures thereof. For example, according to one non-limiting embodiment, the polyol monoester of an unsaturated vegetable oil fatty acid can be a propylene glycol monoester of an unsaturated vegetable oil fatty acid selected from the group consisting of corn oil fatty acids, sunflower oil fatty acids, and mixtures thereof. One non-limiting example of a commercially available propylene glycol monoester of an unsaturated vegetable oil fatty acid is ARCHER RC™ coalescent, which is available from Archer Daniels Midland Company of Decatur, Ill.

The esters of unsaturated fatty acids contemplated for use in conjunction with the various non-limiting embodiments disclosed herein are essentially free of VOCs as determined by EPA Reference Method 24 and can act as coalescing aids when added to an aqueous-coating composition. Consequently, when the thickening systems according to various non-limiting embodiments disclosed herein are incorporated into aqueous-coating compositions, the need for other VOC-containing coalescing aids in the coating composition can be reduced or eliminated.

The thickening systems according to various non-limiting embodiments disclosed herein can comprise any amount of xanthan gum necessary to produce the desired rheological properties when added to an aqueous-coating composition, either alone or in conjunction with one or more other thickeners. For example, if necessary to achieve the desired rheological properties in the aqueous-coating composition, in addition to xanthan gum, the thickening systems according to certain non-limiting embodiments disclosed herein can comprise one or more other thickeners, such as, but not limited to, cellulosic thickeners (such as HEC and hydrophobically modified HEC (or "HMHEC")) and synthetic thickeners. Non-limiting examples of suitable synthetic thickeners include synthetic associative thickeners, such as hydrophobically modified ethoxylated urethanes (or "HEURS"), which consist of an ethylene oxide chain terminated with a hydrophobe such as octadecyl, and hydrophobically modified alkali swellable thickeners polymerized with ethyl-acrylate, methacrylic acid, and a hydrophobe such as a nonyl-phenol (or "HASE"); and various water-soluble polymers, such as polyethylene glycol derivatives, polyol monoethers, fatty acid-esterified polyoxyalkylene ethers of glycerol or propane-1,2-diol or other polyhydric alcohols, and alkylpolyethylene glycol ether fatty acid esters. These and other suitable synthetic thickeners are described U.S. Patent Publication No. 2003/0187103, which is hereby specifically incorporated by reference herein.

The thickening systems according to various non-limiting embodiments disclosed herein can comprise any amount of carrier necessary to disperse the xanthan gum, provide the desired hydration properties, and/or impart desired film-formation characteristics to the aqueous-coating composition. For example, in one non-limiting embodiment wherein the at least one ester of an unsaturated fatty acid of the thickening system is the only coalescing aid to be added to the aqueous-coating composition, the amount of the unsaturated fatty acid ester used can be any amount necessary to impart the desired film-formation characteristics to the aqueous-coating composition. In other non-limiting embodiments, wherein one or more other coalescing aids are added to the aqueous coating composition in addition to the unsaturated fatty acid ester, the amount of the unsaturated fatty acid ester used in the thickening system can be any amount effective to disperse the xanthan gum and/or provide the desired coalescing properties in conjunction with the other coalescing aid(s).

The thickening system according to various non-limiting embodiments disclosed herein can comprise a non-aqueous mixture of xanthan gum and the carrier or the mixture can further comprise water. As used herein, the term "non-aqueous mixture" means a mixture wherein water is not added as a separate component of the mixture. Thus, as used herein the term "non-aqueous mixture" includes mixtures that include components that may contain small amounts of water (for example water that is adsorbed on the surface of the component or otherwise contained within the component), provided that water is not added to the mixture as a separate component.

Another non-limiting embodiment provides a latex paint thickening system comprising a mixture of a xanthan gum and a carrier comprising at least one polyol monoester of an unsaturated fatty acid, wherein the latex paint thickening system is essentially free of volatile organic compounds as determined by EPA Reference Method 24. According to this non-limiting embodiment, the mixture can be a non-aqueous mixture or the mixture can further comprise water. Non-limiting examples of xanthan gums that are suitable for use in conjunction with this non-limiting embodiment are set-forth above.

Non-limiting examples of polyol monoesters of unsaturated fatty acids that are suitable for use in conjunction with this non-limiting embodiment are set forth above. While it is generally contemplated that the latex paint thickening system according to various non-limiting embodiments disclosed herein can comprise a polyol monoester of any vegetable oil fatty acid, as previously discussed, some vegetable oil fatty acid esters can cause yellowing of the coating composition into which they are incorporated. Since yellowing of latex paints is generally not desired, the latex paint thickening system according to various non-limiting embodiments disclosed herein can comprise a non-yellowing polyol monoester of a vegetable oil fatty acid. For example, according to one specific non-limiting embodiment, the at least one polyol monoester of an unsaturated fatty acid can be a glycol monoester of a vegetable oil fatty acid chosen from corn oil fatty acids and sunflower oil fatty acids. In another specific, non-limiting embodiment, the at least one polyol monoester of an unsaturated fatty acid of the latex paint thickening system can a propylene glycol monoester of an unsaturated fatty acid chosen from corn oil fatty acids and sunflower oil fatty acids. Nevertheless, as previously discussed, in certain non-limiting embodiments wherein yellowing is not problematic and/or a decolorization step or additive is employed, the carrier can comprise a vegetable oil fatty acid ester that can cause yellowing, either alone or in conjunction with a non-yellowing fatty acid ester.

Further, as discussed above with respect to the various non-limiting embodiments of thickening systems, in addition to xanthan gum, the latex paint thickening systems according to various non-limiting embodiments can further comprise one or more other thickeners, including without limitation, cellulosic thickeners and synthetic thickeners.

Other non-limiting embodiments disclosed herein relate to aqueous-coating compositions and latex paints prepared from thickening systems according to various non-limiting embodiments disclosed herein. For example, one non-limiting embodiment provides an aqueous-coating composition prepared from a latex polymer, and a thickening system comprising a mixture of a xanthan gum and a carrier comprising at least one ester of an unsaturated fatty acid, wherein the thickening system is essentially free of volatile organic compounds as determined by EPA Reference Method 24. Non-limiting examples of xanthan gums and unsaturated fatty acid esters that are suitable for use in conjunction with the aqueous coating compositions according to various non-limiting embodiment disclosed herein are described above in detail. Non-limiting embodiments of methods of preparing such aqueous-coating compositions are described below in more detail.

As used herein the term "latex polymer" refers to a suspension and/or emulsion of a polymer in water. Further, as used herein the term "polymer" means an at least partially polymerized material, and includes both homopolymers and copolymers. Suitable polymers for use as latex polymers according to this and other non-limiting embodiments disclosed herein include, but are not limited to, high molecular weight, cross-linkable polymers of the addition-type or of the condensation-type. Examples of such polymers include, but are not limited to, acrylic polymers, styrene-acrylic polymers, and vinyl acrylic polymers.

Still other non-limiting embodiments disclosed herein generally relate to aqueous-coating compositions, and more specifically relate to latex paints. As previously discussed herein, while directly incorporating unmodified xanthan gum into aqueous-coating compositions is generally difficult due to rapid hydration and gel formation, the inventors have found that if xanthan gum is added to the aqueous-coating composition in the form of a mixture of xanthan gum and a carrier comprising at least one ester of an unsaturated fatty acid, the xanthan gum can be readily dispersed into the coating composition without the need to use high shear mixing or specially treated materials. When added to the aqueous-coating composition, the xanthan gum of the thickening system can act as a thickener that modifies the rheology of the coating composition, while the at least one ester of an unsaturated fatty acid can act as a coalescing aid that aids in film-formation during drying of the coating composition. Further, since the at least one ester of an unsaturated fatty acid does not contribute to the VOC content of the aqueous-coating composition to which it is added, aqueous-coating compositions can have a reduced VOC content as compared to aqueous-coating composition prepared with equivalent amounts of VOC-containing coalescing aids.

For example, according to various non-limiting embodiments there is provided an aqueous-coating composition comprising a xanthan gum and at least one coalescing aid comprising at least one ester of an unsaturated fatty acid that is essentially free of volatile organic compounds as determined by EPA Reference Method 24. Suitable non-limiting examples of xanthan gums and esters of unsaturated fatty acids that can be used in conjunction with this non-limiting embodiment are set forth above. Further, according to various non-limiting embodiments, the aqueous-coating composition can comprise one or more additional coalescing aids in addition to the at least one ester of an unsaturated fatty acid.

Further, as discussed above with respect to the various non-limiting embodiments of thickening systems, in addition to xanthan gum, the aqueous-coating compositions according to various non-limiting embodiments can further comprise one or more other thickeners, including without limitation cellulosic thickeners and synthetic thickeners.

In one specific non-limiting embodiment, the aqueous-coating composition can be a latex paint comprising a latex polymer, at least one pigment, a thickener comprising a xanthan gum, and at least one coalescing aid comprising at least one polyol monoester of an unsaturated fatty acid that is essentially free of volatile organic compounds as determined by EPA Reference Method 24. Suitable non-limiting examples of latex polymers, xanthan gums, and polyol monoesters of unsaturated fatty acids that can be used in conjunction with this non-limiting embodiment are set forth above.

In another specific, non-limiting embodiment, the aqueous-coating composition can be a high-build exterior latex paint, such as roof paint or roof mastic. As used herein the term "high-build" with reference to latex paints means paints that are sag resistant at a coating thickness of at least 14 mils as determined by the MODIFIED SAG TEST (discussed below) or paints that do not sag when tested at a coating build thickness of at least 14 mils using an Anti-Sag Meter. Sag testing using an Anti-Sag Meter is discussed in more detail in the Examples.

For example, according to one non-limiting embodiment, the aqueous-coating composition does not sag when tested at a coating build thickness of at least 14 mils using an Anti-Sag Meter. According to another non-limiting embodiment, the aqueous-coating composition does not sag when tested at a coating build thickness of at least 35 mils using an Anti-Sag Meter. According to still another non-limiting embodiment, the aqueous-coating composition does not sag when tested at a coating build thickness of at least 60 mils using an Anti-Sag Meter.

In still another non-limiting embodiment, the aqueous-coating compositions can be sag resistant at a coating thickness of 30 mils as determined by the MODIFIED SAG TEST. According to the MODIFIED SAG TEST, a 30 mil thick coating of the aqueous-coating composition is applied to a flat substrate, scored with a pencil to form parallel lines in the coating, and the substrate is hung such that the flat substrate is perpendicular to the plane of the floor and lines formed in the coating are horizontal and parallel to the floor. In this orientation, the force of gravity will tend to cause the coating to sag over the scored lines. After the 30 mil thick coating has dried, the substrate is visually inspected. If the portion of the coating above the center section of each line did not sag so as to obscure the center section of the line below the portion, the coating composition is said to be sag resistant at a thickness of 30 mils as determined by the MODIFIED SAG TEST.

For example, referring now to FIG. 1A, there is shown a photograph of a MODIFIED SAG TEST substrate (generally indicated 10a) for a 30 mil thick coating 12a of an aqueous coating-composition ("Composition A," which is described in detail in Example 2 of the Example section below) according to various non-limiting embodiments disclosed herein. As can be seen in FIG. 1A, the portion 14a of coating 12a above the center section of line 16a does not sag so as to obscure the center section of line 16a. Similarly, the portions 18a and 20a of coating 12a above the center section of lines 22a and 24a, respectively, do not sag so as to obscure the center section of lines 22a and 24a. By comparison, FIG. 1B shows a photograph of a MODIFIED SAG TEST substrate (generally indicated 10b) for a 30 mil thick coating 12b of a conventional aqueous-coating composition ("Comparative Composition B," which is described in detail in Example 2 of the Example section below). As can be seen from FIG. 1B, the central section of line 16b is obscured by the portion 14b of coating 12b above the central section of line 16b. Another method of measuring sag resistance is described in ASTM D 4400-99 "Standard Test Method for Sag Resistance of Paints Using a Multinotch Applicator," which is hereby specifically incorporated by reference.

Still another non-limiting embodiment provides a substrate comprising an at least partial coating of an aqueous-coating composition on at least a portion of at least one surface of the substrate, the aqueous-coating composition comprising a thickener comprising a xanthan gum and at least one coalescing aid comprising at least one ester of an unsaturated fatty acid, wherein the a coalescing aid is essentially free of volatile organic compounds as determined by EPA Reference Method 24. Non-limiting examples of xanthan gums and esters of an unsaturated fatty acid that can be used in conjunction with the non-limiting embodiment are set forth above. Non-limiting methods of forming at least partial coatings of aqueous-coating compositions on at least a portion of a substrate are described below in more detail.

As used herein the term "substrate" refers to any object upon which an at least partial coating of the aqueous-coating composition can be formed. For example, although not limiting herein, according to certain non-limiting embodiments the substrate can be an interior or exterior surface of a building, for example an interior or exterior wall, a roof, a floor, a ceiling or any portion thereof. In one specific non-limiting embodiment, the substrate is at least a portion of a roof. In another specific non-limiting embodiment, the substrate is at least a portion of an interior or exterior wall. Other non-limiting examples of suitable substrates include infrastructural elements (e.g., bridges and other structures), furniture, decorative items, cloth or paper, and equipment.

As used herein the term "coating" refers to a film or layer formed from an aqueous-coating composition, without regard to the thickness of the film or layer, and further includes dry, partially dry, and wet coatings (that is, coatings that have not been at least partially or fully dried). As used herein with respect to coatings, the terms "dry", "dried", or "drying" refer to evaporation of solvents (such a water and/or organic solvents if present) from the coating composition. Thus, a partially dry coating refers to a coating wherein at least a portion of the solvents have been evaporated from the coating. Additionally, the term "coating" as used herein includes both cured and uncured coatings. As used herein, the term "cured" means that any cross-linkable or co-reactive component of the composition are at least partially cross-linked or co-reacted. It will be appreciated by those skilled in the art that cured coatings can be dry, partially dry or wet coatings.

Further, the coatings according to various non-limiting embodiments may be applied or provided above or over, but not necessary adjacent, to the surface of the substrate. For example, although not limiting herein, the coating can be applied directly on the substrate, or one or more other coatings (for example a primer coating) can be applied therebetween.

According to one non-limiting embodiment, at least one at least partial coating is an at least partially dried coating that is essentially free of mud-cracks. As used herein the term "mud-cracks" refers to irregular cracks in a dry or at least partially dry coating, and is typically associated with thicker coatings. As used herein the term "essentially free of mud-cracks" means that the dry or at least partially dry coating has no visible mud-cracks.

As previously discussed, the present invention further contemplates methods of forming thickening systems for aqueous-coating compositions and methods of thickening aqueous-coating compositions. For example, one non-limiting embodiment provides a method of forming a thickening system comprising combining a xanthan gum and at least one carrier comprising at least one ester of an unsaturated fatty acid, the at least one carrier being essentially free of volatile organic compounds as determined by EPA Reference Method 24; and dispersing at least a portion of the xanthan gum in at least a portion of the at least one carrier to form the thickening system. As discussed below, according to this non-limiting embodiment, combining the xanthan gum and the at least one carrier and dispersing at least a portion of the xanthan gum in at least a portion of the at least one carrier can occur at substantially the same time or can occur in separately. Non-limiting examples of xanthan gums and esters of unsaturated fatty acids that are useful in conjunction with the methods of forming thickening systems according to various non-limiting embodiments disclosed herein are set forth above.

Methods of combining and/or dispersing the xanthan gum and the carrier according to this non-limiting embodiment include those methods of combining and/or dispersing powders into carriers that are generally known in the art. For example, although non-limiting herein, at least a portion of the xanthan gum can be combined with at least portion of the carrier by adding the xanthan gum to the carrier without agitation. Thereafter, the xanthan gum can be dispersed in the carrier by stirring or blending the carrier and the xanthan gum. Alternatively, combining and dispersing the xanthan gum and the carrier can occur at substantially the same time by adding the xanthan gum to the carrier with agitation.

Another non-limiting embodiment provides a method of forming an aqueous-coating composition comprising forming a thickening system comprising a mixture of a xanthan gum and at least one carrier comprising at least one ester of an unsaturated fatty acid, the thickening system being essentially free of volatile organic compounds as determined by EPA Reference Method 24; combining at least a portion of the thickening system with at least a portion of an aqueous-coating composition; and at least partially hydrating at least a portion of the xanthan gum. Further according to this non-limiting embodiment, the xanthan gum can be at least partially hydrated prior to incorporation into the portion of the aqueous-coating composition, after incorporation, or both before and after incorporation into the portion of the aqueous-coating composition. Still further, according to this non-limiting embodiment, at least a portion of the thickening system can be combined with at least a portion of the aqueous-coating composition without the use of high-shear mixing.

Still other embodiments of the present invention contemplate methods of forming at least partial coatings of an aqueous-coating composition. For example, one non-limiting embodiment provides a method of forming an at least partial coating of an aqueous-coating composition on at least a portion of a substrate, the method comprising providing an aqueous-coating composition comprising a latex polymer, a thickener comprising a xanthan gum, and at least one coalescing aid comprising at least one ester of an unsaturated fatty acid, wherein the at least one coalescing aid is essentially free of volatile organic compounds as determined by EPA Reference Method 24; and applying at least a portion of the aqueous-coating composition to at least a portion of the substrate to form the at least partial coating on the at least a portion of the substrate. Non-limiting examples of substrates and aqueous coating compositions that are suitable for use with the aforementioned non-limiting embodiment are set forth above in detail.

Non-limiting methods of applying at least a portion of the aqueous-coating composition to at least a portion of the substrate to form an at least partial coating include brushing, spraying, flow coating, dipping, sponging, and rolling. Such methods of applying aqueous-coating compositions to at least a portion of a substrate are generally known in the art.

In one specific non-limiting embodiment wherein the substrate is an interior wall and the aqueous-coating composition is a latex paint, the methods of applying the at least partial coating can be chosen from brushings, rolling, and spraying. In one specific non-limiting embodiment wherein the substrate is a roof and the aqueous-coating composition is a high-build exterior latex paint, the methods of applying the at least partial coating can be chosen from brushings, rolling, and spraying.

Further, according to various non-limiting embodiments, after applying at least a portion of the aqueous-coating composition to the at least a portion of the substrate to form the at least partial coating, at least a portion of the at least partial coating can be at least partially dried. Still further, once the at least partial coating is at least partially dry or dry, according to various non-limiting embodiments, the at least partial coating can be essentially free of mud-cracks.

Various embodiments disclosed herein will now be illustrated in the following, non-limiting examples.

EXAMPLES

Example 1

A thickening system for an aqueous-coating composition comprising a non-aqueous mixture of xanthan gum and a carrier comprising an ester of an unsaturated acid was prepared as follows: 7.26 pounds of ARCHER RC™ coalescent, which is a propylene glycol monoester of an unsaturated vegetable oil fatty acid was added to a pre-mix container. According to the manufacturer, ARCHER RC™ coalescent does not contribute to VOC emissions when tested a part of a representative paint formulation according to EPA Reference Method 24. Thereafter, 4.39 pounds of Xanthan Gum 614 (unmodified xanthan gum that is commercially available from Archer Daniel Midland Company of Decatur, Ill. as OptiXan™ brand xanthan gum) was added to the pre-mix container and the contents of the pre-mix container were stirred until the xanthan gum was dispersed into the carrier to form the thickening system. It was observed that the xanthan gum could be readily dispersed into the carrier without gel formation.

A comparative pre-mix of xanthan gum and water was made as follows. One (1) gram of Xanthan Gum 614 was added to 20 grams of water in a pre-mix container with stirring. It was observed that the xanthan gum could not be readily dispersed into the water as a gel with agglomerates of non-hydrated xanthan gum formed immediately upon the addition of the xanthan gum to the water.

Example 2

Two aqueous-coating compositions for high-build roof coating applications were prepared and tested as follows. One aqueous-coating composition ("Composition A") was made by mixing a thickening system comprising a non-aqueous mixture of OptiXan™ brand xanthan gum and ARCHER RC™ coalescent into the remaining coating composition in accordance with various non-limiting embodiments disclosed herein. The composition and mixing procedure for Composition A is set for the below in Table I. In Table I, the amounts of raw materials are given as pounds per 100 gallons of paint.

The other aqueous-coating composition ("Comparative Composition B") was made by adding a conventional HEC thickener (NATROSOL® 250 MXR hydroyethylcellulose, which is commercially available from Hercules, Inc. of Wilmington, Del.), to the coating composition using conventional incorporation methods. The composition and mixing procedure for Comparative Composition B is set for the below in Table II. In Table II, the amounts of the raw materials are given as pounds per 100 gallons of paint.

TABLE I

Composition A

| Raw Material | Amount (Pounds) |
| --- | --- |
| Add Raw Materials 1-4 to a kettle with mixing. | |
| 1. Water | 160.38 |
| 2. KTPP[1] | 1.50 |
| 3. Tamol[2] 901 | 4.98 |
| 4. Foamaster[3] NXZ | 1.99 |
| Add Raw Materials 5-6 to kettle and grind at high speed for 15-30 minutes to Hegman 4.5-5 | |
| 5. Duramite[4] | 382.89 |
| 6. Titanium Dioxide R-960[5] | 73.53 |
| Reduce mixing speed and add Raw Material 7 ("let down") | |
| 7. Rhoplex[6] EC-2540 | 492.27 |
| Add Raw Materials 8-10 to kettle while mixing | |
| 8. Foamaster[3] NXZ | 1.99 |
| 9. Skane[7] M-8 | 0.99 |
| 10. Ethylene Gylcol | 25.51 |
| In a separate container, mix Raw Materials 11 and 12 to form a pre-mix. Add pre-mix to kettle with mixing and continue to mix until paint is smooth. | |
| 11. Archer RC ™ Coalescent | 7.26 |
| 12. OptiXan ™ Xanthan Gum | 4.39 |

[1]Potassium tetrapyrophosphate, a dispersant, which is available from Astaris LLC of St. Louis, MO.
[2]TAMOL ® dispersant, available from Rohm and Haas Company of Philadelphia, PA.
[3]FOAMASTER ® defoamer, available from Cognis Corporation of Ambler, PA.
[4]DURAMITE ® calcium carbonate powder, available from Imerys North American Performance Minerals.
[5]Titanium Dioxide R-960 titanium dioxide powder, available from DuPont Company of Wilmington, DE.
[6]RHOPLEX ® acrylic latex resin, available from Rohm and Haas Company of Philadelphia, PA.
[7]SKANE ® biocide available from Rohm and Haas Company of Philadelphia, PA.

TABLE II

Comparative Composition B

| Raw Material | Amount (Pounds) |
| --- | --- |
| Add Raw Materials 1-4 to a kettle with mixing. | |
| 1. Water | 160.45 |
| 2. KTPP | 1.50 |
| 3. Tamol 901 | 4.98 |
| 4. Foamaster NXZ | 2.00 |
| Add Raw Materials 5-6 to kettle and grind at high speed for 15-30 minutes to Hegman 4.5-5 | |
| 5. Duramite | 383.04 |
| 6. Titanium Dioxide R-960 | 73.56 |
| Reduce mixing speed and add Raw Material 7 ("let down") | |
| 7. Rhoplex EC-2540 | 492.47 |
| Add Raw Materials 8-12 to kettle while mixing, and continue mixing until paint is smooth. | |
| 8. Foamaster NXZ | 2.00 |
| 9. Texanol[8] | 7.27 |
| 10. Skane M-8 | 0.99 |
| 11. Ethylene Gylcol | 25.52 |
| 12. Natrosol[9] 250 MXR | 4.39 |

[8]TEXANOL ® ester alcohol, available from Eastman Chemical Company of Kingsport, TN.
[9]NATROSOL ® hydroxyethylcellulose, available from Hercules Incorporated of Wilmington, DE.

After preparation the VOC content of each coating composition was measured according to EPA Reference Method 24. As shown below in Table III, Composition A had a lower VOC content then Comparative Composition B when tested according to EPA Reference Method 24.

| Coating Composition | VOC Content (g/L) per EPA Reference Method 24 |
| --- | --- |
| COMPOSITION A | 62.40 |
| COMPARATIVE COMPOSITION B | 78.60 |

Further, the sag resistance of each coating composition was tested both using the MODIFIED SAG TEST (which is described herein above in detail) and using an Anti-Sag Meter as described below.

With reference to FIGS. 1A and 1B, as previously discussed, FIG. 1A is a photograph of the MODIFIED SAG TEST substrate (generally indicated 10a) for a 30 mil thick coating 12a of Composition A and FIG. 1B is a photograph of the MODIFIED SAG TEST substrate (generally indicated 10b) for a 30 mil thick coating 12b of Comparative Composition B. As can be seen from FIGS. 1A and 1B, when tested using the MODIFIED SAG TEST, the 30 mil thick coating of Composition A was sag resistant, whereas the 30 mil thick Comparative Composition B was not.

Figure 2:
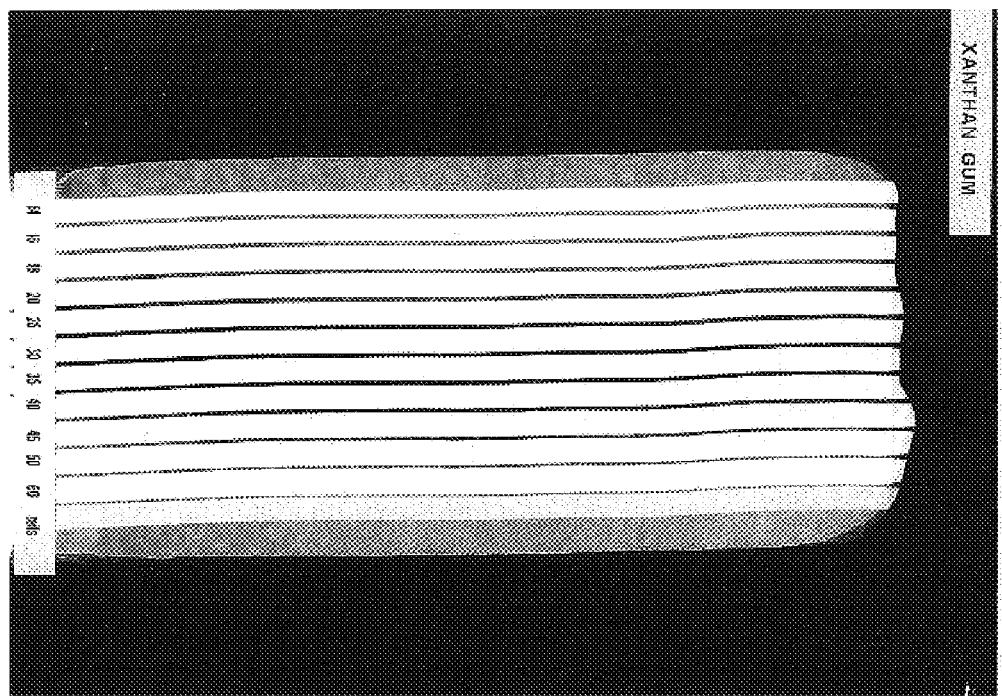
FIG. 2 is a photograph of a draw down card for a latex paint composition including xanthan gum.
Figure 3:
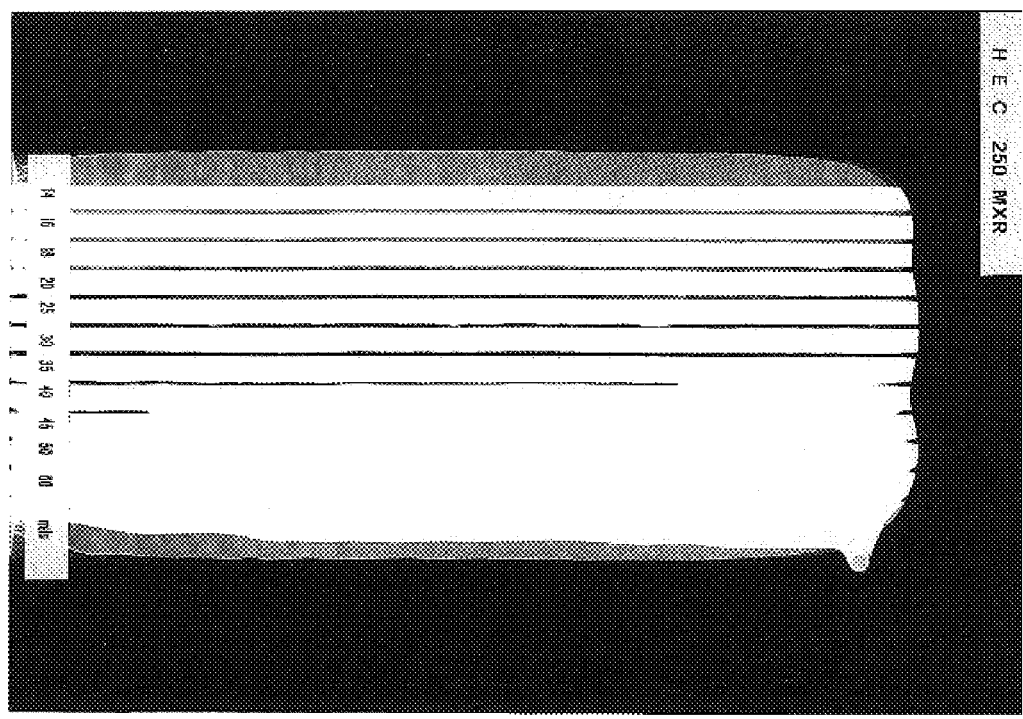
FIG. 3 is a photograph of a draw down card for a latex paint composition including hydroxyethylcellulose ("HEC")

With reference to FIGS. 2 and 3, wherein FIG. 2 is a photograph of a draw down card made using Composition A and FIG. 3 is a photograph of a draw down card made using Comparative Composition B, the coating compositions were tested using a Anit-Sag Meter (indicated as Anit-Sag Meter-3 ("ASM-3") in ASTM D 4400-99) as follows. An amount of the coating composition to be tested was drawn down on a dark colored card using an Anti-Sag Meter multinotch applicator (available from Leneta Co, of Mahwah, N.J.) to form a series of parallel coating stripes of increasing build thickness (ranging from 14 mils (350 microns) to 60 mils (1500 microns)) on the card. The thickness of each coating stripe corresponded to the notch on the multinotch applicator that was used to form the stripe. As shown in FIGS. 2 and 3, each coating stripe was separated by uncoated line or region. Immediately after drawing down the coating composition, the card was hung perpendicular to the floor such that the stripes were in horizontal position (like rungs on a standing ladder) with the 14 mil thick stripe at the top of the card. The coating composition was allowed to dry in this position. After drying the card was observed to determine which stripe(s), if any, ran or sagged into the next thicker stripe, and the thickest stripe that resisted sag was noted.

Based on the draw down cards shown in FIGS. 2 and 3, it was determined that Composition A was sag resistant at all build thicknesses tested using the Anti-Sag Meter (that is, Composition A did not sag when tested at coating build thicknesses of 60 mils or less using an Anti-Sag Meter), while Comparative Composition B was sag resistant up to a build thickness of 30 mils using the Anti-Sag Meter. That is, Comparative Composition B did not sag when tested at coating build thicknesses of 30 mils or less using an Anti-Sag Meter.

Example 3

Two water-based thickening systems were prepared as follows. One thickening system (indicated as "XG" in Table IV) was prepared by adding 6.0 grams of water-dispersible, surface modified xanthan gum as received (OptiXan™-D, which is commercially available from Archer Daniels Midland Company of Decatur, Ill.) to 294.0 grams of simulated tap water (described below) with mixing. A comparative thickening system (indicated as "HEC" in Table IV) was prepared by adding 6.0 grams of HEC as received (NATROSOL® 250 MXR) to 294.0 grams of simulated tap water with mixing. The pH of each thickening systems was adjusted to 10.0 with $NH_4OH$ after addition of the thickener (i.e., xanthan gum or HEC). The simulated tap water was made by adding 1.0 grams/liter NaCl and 0.15 grams/liter $CaCl_2.2H_2O$ to deionized water.

Figure 4:
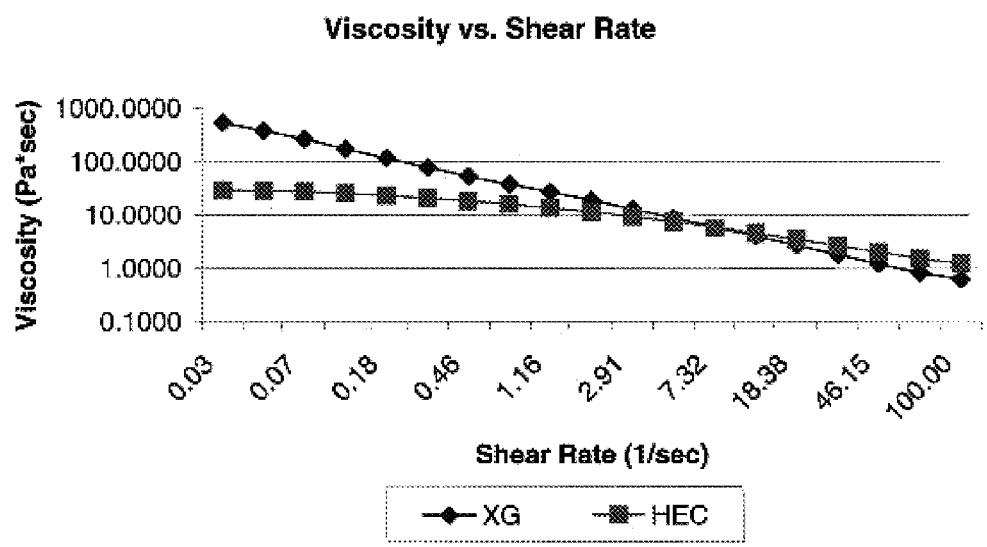
FIG. 4 is a graph showing plots of viscosity vs. shear rate for an aqueous dispersion of xanthan gum and an aqueous dispersion of HEC.

The viscosity of each thickening system was measured at shear rates ranging from about 0.03 $sec^{-1}$ to 100 $sec^{-1}$ using a TA Instruments AR1000N Rheolyst Rheometer. The results of the viscosity testing are shown below in Table IV. Plots of the viscosity vs. shear rate for each thickening system are shown in FIG. 4. As can be seen from the results in Table IV and the plots of FIG. 4, at the lower shear rate tested (e.g., shear rates less than about 1 $s^{-1}$) thickening system XG exhibited higher viscosity than the thickening system HEC; while at the higher shear rates tested (e.g., shear rates of about 10-100 $s^{-1}$), thickening system XG exhibited lower viscosity than thickening system HEC.

TABLE IV

| Shear rate ($sec^{-1}$) | XG Viscosity (Pa * sec) | HEC Viscosity (Pa * sec) |
| --- | --- | --- |
| 0.0297 | 536.6000 | 29.2800 |
| 0.0462 | 382.0000 | 28.8600 |
| 0.0735 | 266.6000 | 27.3600 |
| 0.1163 | 173.5000 | 25.4500 |
| 0.1838 | 116.4000 | 23.2000 |
| 0.2914 | 78.0400 | 20.8300 |
| 0.4615 | 53.1700 | 18.3100 |
| 0.7315 | 37.3800 | 15.8600 |
| 1.1590 | 26.7600 | 13.4600 |
| 1.8370 | 18.6800 | 11.2000 |
| 2.9120 | 12.6200 | 9.1190 |
| 4.6150 | 8.5810 | 7.2820 |
| 7.3150 | 5.8320 | 5.7280 |
| 11.5900 | 3.9470 | 4.4530 |
| 18.3800 | 2.6360 | 3.4270 |
| 29.1200 | 1.7600 | 2.6090 |
| 46.1500 | 1.1720 | 1.9660 |
| 73.1500 | 0.7917 | 1.4630 |
| 100.0000 | 0.6076 | 1.1940 |

Example 4

Coating Compositions 1-8 set forth below in Table V were prepared using different thickening systems. The thickening system of Coating Composition 1 was a standard thickening system including HEC (NATROSOL® 240 MXR), and a carrier including TEXANOL® ester alcohol (a coalescing aid) and ethylene glycol. The thickening system of Coating Composition 2 included NATROSOL® 240 MXR HEC and water as a carrier. The thickening systems of Coating Compositions 3, 4, and 8 included a xanthan gum (OptiXan™), and a carrier including ARCHER RC™ coalescent and water; while the thickening systems in Coating Compositions 5-7 included a non-aqueous mixture of xanthan gum (OptiXan™) and ARCHER RC™ coalescent as a carrier. In addition, all of the thickening systems including xanthan gum included FOAMASTER® NXZ defoamer.

The coating compositions set forth in Table V were prepared as follows. A pre-mix ("Premix 1") was formed by mixing together items 1-6 in Table V in a pre-mix container using a low speed to incorporate the raw materials and then a high speed mixing in to disperse the pigments. Thereafter, items 7 to 9 were added to Premix 1 using a slower mixing speed to prevent deterioration of the latex materials. In a separate container, the components of the thickening system (i.e., items 10-16, as appropriate) were mixed together to form Premix 2. Premix 2 was then added to Premix 1 using a medium mixing speed, and the coating composition was mixed until smooth and lump free.

TABLE V

| | Coating Composition | | | | | | | |
| --- | --- | --- | --- | --- | --- | --- | --- | --- |
| Raw Material | 1 (comparative) (lbs./100 gal) | 2 (comparative) (lbs./100 gal) | 3 (lbs./100 gal) | 4 (lbs./100 gal) | 5 (lbs./100 gal) | 6 (lbs./100 gal) | 7 (lbs./100 gal) | 8 (lbs./100 gal) |
| 1. Water | 161.60 | 161.60 | 161.60 | 161.60 | 161.60 | 161.60 | 161.60 | 161.60 |
| 2. KTPP | 1.51 | 1.51 | 1.51 | 1.51 | 1.51 | 1.51 | 1.51 | 1.51 |
| 3. TAMOL 901 | 5.02 | 5.02 | 5.02 | 5.02 | 5.02 | 5.02 | 5.02 | 5.02 |
| 4. FOAMASTER NXZ | 2.01 | 2.01 | 2.01 | 2.01 | 2.01 | 2.01 | 2.01 | 1.01 |

TABLE V-continued

| | Coating Composition | | | | | | | |
|---|---|---|---|---|---|---|---|---|
| Raw Material | 1 (comparative) (lbs./ 100 gal) | 2 (comparative) (lbs./ 100 gal) | 3 (lbs./ 100 gal) | 4 (lbs./ 100 gal) | 5 (lbs./ 100 gal) | 6 (lbs./ 100 gal) | 7 (lbs./ 100 gal) | 8 (lbs./ 100 gal) |
| 5. DURAMITE | 385.79 | 385.79 | 385.79 | 385.79 | 385.79 | 385.79 | 385.79 | 385.79 |
| 6. TiO$_2$ R-960 | 74.09 | 74.09 | 74.09 | 74.09 | 74.09 | 74.09 | 74.09 | 74.09 |
| 7. RHOPLEX EC-2540 | 496.00 | 496.00 | 496.00 | 496.00 | 496.00 | 496.00 | 496.00 | 496.00 |
| 8. FOAMASTER NXZ | 2.01 | 2.01 | — | — | — | — | — | — |
| 9. SKANE M-8 | 1.00 | 1.00 | 1.00 | 1.00 | 1.00 | 1.00 | 1.00 | 1.00 |
| 10. Ethylene Glycol | 25.70 | 0.0 | 0.0 | 0.0 | 0.0 | 0.0 | 0.0 | 0.0 |
| 11. NATROSOL 250 MXR | 4.42 | 4.42 | — | — | — | — | — | — |
| 12. OptiXan ™ | — | — | 5.45 | 4.42 | 3.3 | 3.3 | 3.3 | 3.3 |
| 13. TEXANOL | 7.32 | 0.0 | — | — | — | — | — | — |
| 14. ARCHER RC ™ | — | — | 12.56 | 3.82 | 3.3 | 2.0 | 1.65 | 1.65 |
| 15. FOAMASTER NXZ | — | — | 2.01 | 2.01 | 2.01 | 2.01 | 3.0 | 3.02 |
| 16. Water | — | 33.02 | 19.86 | 25.70 | — | — | — | 25.70 |

After preparation, the VOC content (as determined according to EPA Reference Method 24), Stormer viscosity (measured using Brookfield KU-1+Viscometer), and sag resistance (using an Anti-Sag Meter as described above) of each coating composition was evaluated. These test results are set forth in Table VI below.

TABLE VI

| | Test Results | | | | | | | |
|---|---|---|---|---|---|---|---|---|
| | Coating Composition | | | | | | | |
| | 1 (comparative) | 2 (comparative) | 3 | 4 | 5 | 6 | 7 | 8 |
| VOC (grams/liter, less water) | 78.60 | 6.00 | 5.81 | 5.94 | 5.96 | 5.98 | 5.98 | 5.99 |
| Viscosity (ku) | 91.0 | 91.2 | 102 | 84.3 | 87.3 | 85 | 87.8 | 81.8 |
| Sag Resistance (mils) | 25 | 30 | none | 50 | 60 | 60 | 60 | 45 |

As indicated in by the data in Table VI, the Comparative Composition 1, which contained a standard thickening system, had the highest level of VOC of any of the coating compositions. As expected, the Comparative Composition 2, which did not contain a coalescent or ethylene glycol, and Compositions 3-8, which contained ARCHER AC® coalescent, had relatively low VOC levels.

Further, as indicated by the data in Table VI, Comparative Compositions 1 and 2, which contained HEC-based thickening systems, were sag resistant to 25 and 30 miles respective. That is, Comparative Compositions 1 did not sag when tested at coating build thicknesses of 25 mils or less using an Anti-Sag Meter, and Comparative Composition 2 did not sag when tested at a coating build thickness of 30 mils or less using an Anti-Sag Meter. In contrast, the coating compositions that included a thickening system including the xanthan gum were sag resistant at higher build thickness.

Example 5

An aqueous-coating composition was prepared using the following procedure. Premix 1 was formed by adding items 1-6 in Table VII one at a time to a pre-mix container while mixing using a Cowles blade. After combining items 1-6, Premix 1 was mixed under high shear until an essentially homogeneous dispersion of the pigments was achieved. As dispersion was achieved, the mixing speed was slowed and items 7 and 8 were added to Premix 1. In a separate container, items 9-11 were mixed to form Premix 2. Thereafter, using a stirrer Premix 2 was slowly added to Premix 1. The mixing speed was then increase to partially hydrate the xanthan gum in Premix 2. Items 12 and 13 were then slowly added to the above mixture (of Premix 1 and Premix 2) and the paint was mixed until a smooth consistency was achieved.

It was observed that by using mixing the aforementioned mixing procedure, less air was entrapped in the coating composition during preparation.

TABLE VII

| Raw Materials | Pounds | Gal |
|---|---|---|
| 1. Water | 443.37 | 53.13 |
| 2. KTPP | 4.14 | 0.52 |
| 3. TAMOL ® 901 | 13.77 | 1.34 |
| 4. FOAMASTER ® NXZ | 2.77 | 0.35 |
| 5. DURAMITE ® | 1058.46 | 46.91 |
| 6. TiO$_2$ R-960 | 203.27 | 6.08 |
| 7. RHOPLEX ® EC-2540 | 680.42 | 77.69 |
| 8. SKANE ® M-8 | 2.75 | 0.33 |
| 9. ARCHER RC ™ | 4.53 | 0.60 |
| 10. OptiXan ™ | 9.05 | 0.82 |
| 11. FOAMASTER ® NXZ | 8.29 | 1.10 |

TABLE VII-continued

| Raw Materials | Pounds | Gal |
| --- | --- | --- |
| 12. RHOPLEX ® EC-2540 | 680.42 | 77.69 |
| 13. Water | 70.51 | 8.44 |

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention, as defined by the appended claims.

We claim:

1. A method of forming a latex paint comprising:
creating a non-aqueous thickening system by combining an unmodified xanthan gum, a curable latex polymer, at least one pigment, and a carrier, the carrier comprising at least one propylene glycol or ethylene glycol monoester of an unsaturated vegetable oil fatty acid that is essentially free of volatile organic compounds as determined by EPA Reference Method 24;
dispersing at least a portion of the unmodified xanthan gum and at least a portion of the latex polymer and at least a portion of at least one pigment in at least a portion of the carrier of the non-aqueous thickening system; and
adding water to the non-aqueous thickening system sufficient to form an aqueous latex paint having improved incorporation of xanthan gum.

2. The method of claim 1 further comprising at least partially hydrating at least a portion of the unmodified xanthan gum before the unmodified xanthan gum is combined with the curable latex polymer, the at least one pigment, and the carrier.

3. The method of claim 1, further comprising adding a cellulosic thickener.

4. The method of claim 1, further comprising adding a synthetic thickener.

5. The method of claim 1,
wherein the xanthan gum is not covalently bonded to the at least one ester of the unsaturated fatty acid.

6. The method of claim 5, wherein the latex paint is sag resistant at a coating thickness of at least 30 mils as determined by MODIFIED SAG TEST.

7. The method of claim 5, wherein the latex paint does not sag when tested at a coating build thickness of at least 14 mils using an Anti-Sag Meter.

8. The method of claim 5, wherein the latex paint does not sag when tested at a coating build thickness of at least 35 mils using an Anti-Sag Meter.

9. The method of claim 5, wherein the latex paint does not sag when tested at a coating build thickness of at least 60 mils using an Anti-Sag Meter.

10. The method of claim 5, wherein the latex paint further comprises a dispersant.

11. The method of claim 10, wherein the latex paint is selected from the group consisting of interior latex paints and exterior latex paints.

12. The method of claim 10, wherein the latex paint is a high-build exterior latex paint.

13. The method of claim 5, further comprising adding a modified xanthan gum.

14. The method of claim 5, further comprising adding at least one additional ester of an unsaturated fatty acid selected from the group consisting of dipropylene glycol monoesters of unsaturated fatty acids, diethylene glycol monoesters of unsaturated fatty acids, methyl esters of unsaturated fatty acids, and mixtures of any thereof.

15. The method of claim 5, wherein the at least one ester of an unsaturated vegetable oil fatty acid is selected from the group consisting of corn oil fatty acids, sunflower oil fatty acids, and mixtures of any thereof.

16. The method of claim 5, wherein the propylene glycol or ethylene glycol monoester of an unsaturated vegetable oil fatty acid is a propylene glycol monoester of an unsaturated vegetable oil fatty acid.

17. The method of claim 5, further comprising adding a cellulosic thickener, a synthetic thickener, or a combination thereof.

18. The method of claim 5, further comprising adding an additive selected from the group consisting of surfactants, dispersants, solvents, water, pH modifiers, defoamers, humectants, colorants, pigments, and mixtures of any thereof.

19. A substrate comprising at least a partial coating of a latex paint on at least a portion of a surface of the substrate, wherein the substrate is selected from the group consisting of a wall, a roof, a floor, a ceiling, furniture, a decorative item, cloth, paper, and equipment, and wherein the latex paint is formed according to a method as recited in claim 5.

20. The substrate of claim 19, wherein the surface is an interior surface or an exterior surface.

21. The substrate of claim 19, wherein the at least a partial coating is essentially free of mud-cracking when at least partially dry.

22. A method of forming a latex paint comprising:
creating a non-aqueous thickening system by combining a xanthan gum, a curable latex polymer, a biocide, and a carrier, the carrier comprising at least one propylene glycol ester of an unsaturated fatty acid that is essentially free of volatile organic compounds as determined by EPA Reference Method 24;
dispersing at least a portion of the xanthan gum and at least a portion of the latex polymer and the biocide in at least a portion of the carrier of the non-aqueous thickening system; and
adding water to the non-aqueous thickening system sufficient to form an aqueous latex paint;
wherein the xanthan gum is not covalently bonded to the at least one ester of the unsaturated fatty acid, and wherein the latex paint exhibits improved incorporation of xanthan gum.

23. The method of claim 22, further comprising at least partially hydrating at least a portion of the unmodified xanthan gum before the unmodified xanthan gum is combined with the curable latex polymer, the biocide, and the carrier.

* * * * *